United States Patent [19]

Sato et al.

[11] Patent Number: 5,012,067

[45] Date of Patent: Apr. 30, 1991

[54] DIAMOND CUTTING METHOD

[75] Inventors: Junichi Sato, Tokyo; Minoru Shimizu, Osaka, both of Japan

[73] Assignees: Showa Denko K.K., Tokyo; Osaka Kongo Seito Co., Ltd., Osaka, both of Japan

[21] Appl. No.: 424,447

[22] Filed: Oct. 20, 1989

[30] Foreign Application Priority Data

Oct. 20, 1988 [JP] Japan ................................ 63-265780

[51] Int. Cl.⁵ ............................................. B23K 26/00
[52] U.S. Cl. ............................ 219/121.72; 219/121.85
[58] Field of Search ..................... 219/121.67, 121.72, 219/121.6, 121.85

[56] References Cited

U.S. PATENT DOCUMENTS 4,476,375 10/1984 Ogawa ........................... 219/121.72
4,546,231 10/1985 Gresser et al. .................. 219/121.72

Primary Examiner—C. L. Albritton
Attorney, Agent, or Firm—Sughrue, Mion, Zinn, Macpeak & Seas

[57] ABSTRACT

A method of machining a diamond workpiece by a laser beam in which a metallic membrane or layer is formed on at least one surface of the workpiece before the workpiece is subjected to the machining operation. The metallic membrane or layer is preferably formed on both side surfaces of a plate-like diamond workpiece. The workpiece machined according to the present invention has a good appearance without cracks and splinters, and a smooth cut surface.

17 Claims, 1 Drawing Sheet

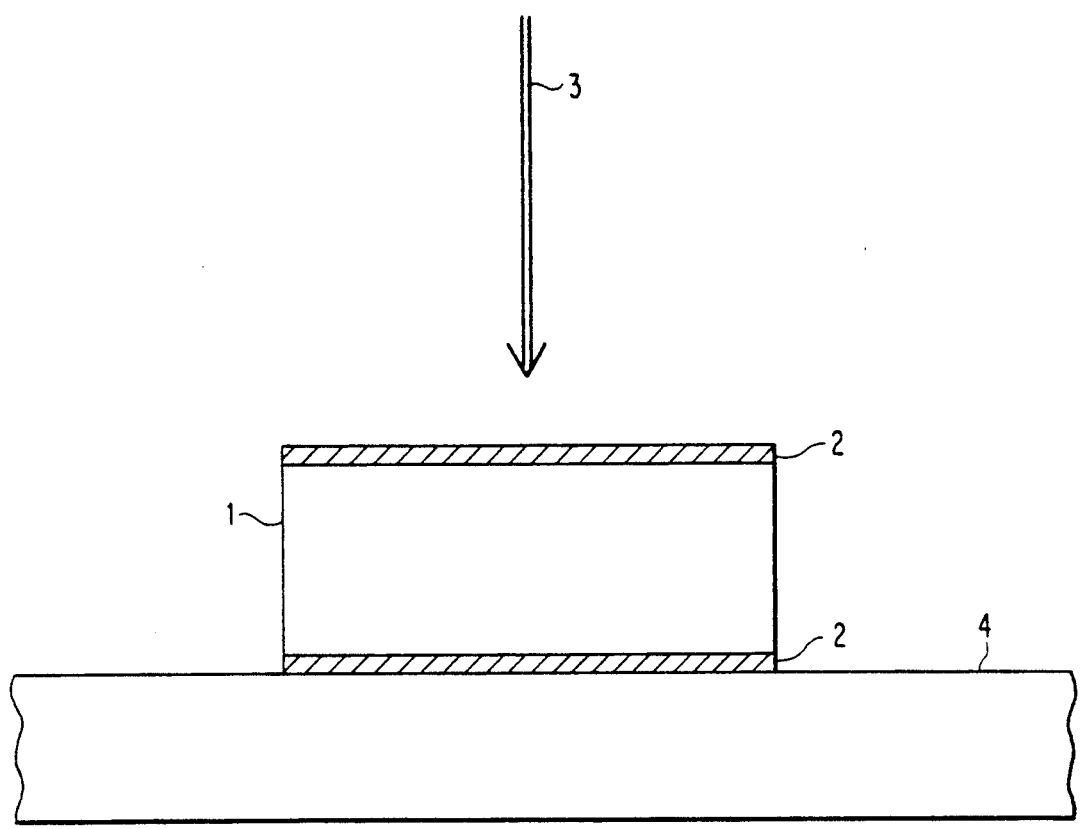

DIAMOND CUTTING METHOD

BACKGROUND OF THE INVENTION

1. Field of the Invention

The present invention relates to a method of machining a diamond plate or block using a laser beam, after a metallic membrane or layer has been deposited on the surface of the diamond plate or block.

2. Description of the Related Art

As diamond is the hardest known material and has a high resistance to abrasion, the machining, i.e., cutting and/or engraving, thereof is very difficult compared to the machining of other gem-stones or hard metals. Diamond, however, has a relatively weaker plane oriented in a certain direction, and thus a rough diamond can be split to a desired size by a cleaving process in which the rough diamond is divided along the cleavage plane.

As an alternative to the cleaving process, diamond can be cut by a sawing process using a saw blade rotated at a high speed while being supplied with diamond powder onto the surface thereof, or by using a steel wire assisted by diamond powder (wire-cutting).

Nevertheless, it is extremely difficult to machine, in particular, a diamond plate, due to the brittleness and hardness thereof. Currently, the only known process by which this can be accomplished is a creep-feed grinding, but in this process, the in-feed of the tool must be set to a minimum rate.

The above conventional processes, however, have the following drawbacks:

The cleaving of a diamond block requires great skill and a very experienced operator. Nevertheless, a portion along which it is desired to split the diamond block is sometimes different from that which can be split, or it is difficult to accurately forecast which portion will be split. The sawing process using a saw blade or a steel wire is liable to damage the diamond workpiece, because of the hardness and the brittleness of the workpiece, and requires a very long processing time. The creep-feed grinding processing of a diamond plate also requires a very long processing time, because the in-feed of the tool must be at a minimum rate. Further, the reliability of this process is not high.

Further, a diamond workpiece, regardless of whether it is a block or a plate, is easily cracked and splintered during the machining process. It is widely known in this field that the diamond workpiece rarely can be normally cut, and even when the diamond workpiece can be cut, a large amount of waste occurs due to cracks and splinters generated during the process, which greatly increases the processing costs.

Currently laser beam machining is widely utilized in many fields, but this technique has not been utilized in diamond processing, because it causes the generation of a larger amount of cracks and splinters.

SUMMARY OF THE INVENTION

Accordingly, an object of the present invention is to avoid the above disadvantages of the prior arts by providing a method of machining a diamond workpiece with a generation of a minimum amount of cracks and splinters, and substantially without the formation of a deteriorated layer in the workpiece.

This object is achieved by a method of machining a diamond workpiece by a laser beam, according to the present invention, wherein a metallic membrane or layer is formed on at least one surface of the workpiece before the workpiece is machined.

The metals used in the metallic membrane or layer may be selected from any kind of metals and alloys. Further, the metallic membrane or layer may be formed directly on the surface of a workpiece by a vacuum evaporation process, and in this case, Au, Cu, Cr, Si, Ti, and Al are preferably used.

Alternatively, the metallic membrane or layer may be formed separately from the workpiece as a foil, and thereafter, firmly adhered to the workpiece. In this case, Au, Ag, Sn, Al, Cu, Fe, and Cr are preferably used.

In the case of an artificial diamond obtained by a CVD method using a Si wafer as a substrate, the diamond crystals are developed on the wafer, and accordingly, the additional formation of the metallic membrane or layer is unnecessary.

In addition to the above methods, the metallic membrane or layer may be formed on the surface of the workpiece by a sputtering, ion-plating, or CVD method. Also, an nonelectrolytic plating process may be adopted for the same purpose.

The metallic membrane or layer must have a thickness of more than 30 Å for a usual workpiece, and in the case of a diamond plate, a thickness of preferably more than 100 Å. Note, since metallic membrane or layer is removed from the workpiece after the laser beam machining, a thickness greater than the above serves no purpose.

To facilitate the firm adhesion of the metallic membrane or layer to the surface of a diamond workpiece, a plurality of different kinds of metal layers may be laminated together to form the resultant layer.

The metallic membrane or layer may be provided on both sides of the workpiece, covering the entire surface thereof, or may be formed on only one side of the workpiece.

Either a natural or an artificial diamond may be machined; the latter being produced by a high pressure method or a CVD method. In particular, most artificial diamonds have a plate-like shape to which the present invention is most suitably applied, and a workpiece thereof having a thinner thickness is most suitable for the realization of the object of the present invention.

The laser beam machining process referred to in this specification is a process such as boring, engraving, or cutting using a laser beam as a tool. The laser beam may be either a solid laser such as a ruby laser, a YAG laser or a glass laser, or a gas laser such as a carbon-dioxide gas laser or an Ar gas laser.

During the machining operation utilizing the laser beam preferably air is blown over a processed portion on the workpiece, so that a gaseous product generated by this machining operation can be removed therefrom.

When the metallic membrane or layer is formed only on one side of the diamond workpiece, the laser beam is preferably applied on the side covered with the metallic membrane or layer. Note, this is not an in dispensable constituent of the present invention, and the laser beam may be applied to either side of the workpiece.

Prior to the laser beam machining, a plurality of diamond plates each having a metallic membrane or layer on one or both sides thereof may be laminated so that each diamond plate except for the uppermost and lowermost plates is sandwiched by the metallic membranes or layers disposed on the sides of the adjacent diamond plates facing thereto. These diamond workpiece are mechanically pressed, or soldered together by flowing silver solder therebetween, to form an integral workpiece. The resultant workpiece can be subjected to a laser beam machining operation so that all of the plates in the workpiece are simultaneously cut in the same fashion and at the same time.

An in-feed rate of the laser beam is preferably less than 2 m/min.

It is considered very difficult, according to the conventional laser beam machining to process the diamond workpiece, especially one in the form of a thin plate, because of the generation of a large number of cracks and splinters during the operation. According to the present invention, however, the provision of the metallic membrane or layer on the diamond workpiece prevents the creation of cracks and splinters and suppresses the formation of a deteriorated layer in the workpiece to a great extent. The resultant product has a better surface smoothness such that even a hair-line crack can not be detected. The reason why such excellent results are obtained is not apparent, but it is assumed that this is due to the balance of the heat-radiation effect and beam dispersion effect between diamond and the metallic membrane or layer. That is, the metallic membrane or layer generally has a heat-conductivity lower than that of the diamond and holds an intensive heat energy imparted by the incident laser beam at the processed location at a level at which cracks will not appear in the workpiece, i.e., a strain caused by a temperature difference is minimized. Also the laser beam is reflected, refracted, and dispersed on the metallic membrane or layer, and thus a thermal stress of the workpiece is reduced.

BRIEF DESCRIPTION OF THE DRAWING

The FIGURE illustrates a preferred embodiment of the present invention.

DESCRIPTION OF THE PREFERRED EMBODIMENTS

A preferred embodiment of the present invention is shown in the FIGURE, which includes a diamond workpiece 1, metallic layers 2, a laser beam 3, and an acrylic plate 4.

The present invention will be described in more detail with reference to the following examples conducted according to the present invention:

EXAMPLE 1

Artificial diamond plates each having a size of 30 mm × 30 mm and a thickness of 30 μm were prepared from a raw material obtained by a plasma CVD method. After polishing both side surfaces of the plates to a smoothness of less than 0.5 μm $R_{max}$, a layer of titanium having a thickness of 500 Å was formed on both side surfaces by a sputtering method to facilitate a firm adhesion of another layer later applied thereon. Thereafter, a layer of copper having a thickness of 0.2 μm was formed thereon by a vacuum evaporation method. These plates were utilized as workpieces for Example 1.

Other artificial diamond plates of the same kind and size, except that the metallic layers were not provided, were prepared for use as workpieces for a comparative example 1.

A cutting test with a laser beam was carried out on each workpiece described above, as follows:

The workpiece was laid on a transparent acrylic plate having a thickness of 2 mm, and fixed thereon by an adhesive tape, and a carbon dioxide gas laser having a wavelength of 10.6 μm and a diameter of 0.34 mm was then projected onto the workpiece. The in-feed rate of the laser beam was 0.3 m/min and the output power thereof was set at three levels of 30 W, 60 W, and 90 W.

Each run was repeated on five workpieces. The test results had a good reproducibility and are listed on Table 1, in which the microscopic observation was performed for detection of a hair-line crack under a magnification of 40.

EXAMPLE 2

Artificial diamond plates each having a side of 30 mm × 30 mm and a thickness of 30 μm were prepared from a raw material obtained by a plasma CVD method. After polishing one side surface thereof to a smoothness of less than 0.5 μm $R_{max}$, a layer of titanium having a thickness of 500 Å was formed on the polished surface by a sputtering method. Thereafter, a layer of copper having a thickness of 0.2 μm was formed thereon by a vacuum evaporation method. These plates were used as workpieces for Example 2.

A cutting test with a laser beam was carried out on each workpiece under the same conditions as in Example 1. In this connection, the laser beam was applied on the side of the workpiece on which the metallic layer was formed.

The test results had a good reproducibility and are listed on Table 1.

By comparing the results of Examples 1 and 2, it can be seen that the provision of the metallic layer on both side surfaces of the workpiece allows a better cutting even by a laser beam having a lower output level.

TABLE 1

| | Output Level of Laser Beam | | |
|---|---|---|---|
| Ex. No. | 30 W | 60 W | 90 W |
| Ex. 1 | Good cutting without cracks. No hair-line cracks detected. | Same as left. | Same as left. |
| Ex. 2 | Impossible to cut No hair-line cracks detected. | Good cutting without cracks. | Same as left. |
| Com. Ex. 1 | Impossible to cut. Many hair-line cracks detected. | Same as left. | Possible to cut but cracks observed. Particularly many hair-line cracks detected. |

A thickness of a deteriorated layer of graphite in the respective side surface of the workpieces cut in Examples 1, 2 and Comparative Example 1 was measured, as shown in Table 2.

TABLE 2

| Ex. No. | Output Level of Laser Beam | Thickness of Det. Layer |
|---|---|---|
| Ex. 1 | 30 W | 32 μm |
| Ex. 2 | 60 W | 40 μm |
| Com. Ex. 1 | 90 W | 52 μm |

A width of a cutting line in the workpiece was 0.34 mm in Examples 1, 2 which was exactly the same as a diameter of the laser beam, and the cut surface was substantially smooth. In the case of Comparative Example 1, the width of the cutting line fluctuated from 0.35 mm to 0.75 mm, and the cut surface of the workpiece contained undulations having a height of from 10 μm to 15 μm.

EXAMPLE 3

Ten workpieces prepared under the same conditions as in Example 1 were laminated with the intervention of amorphous silver solder foil between successive adjacent workpieces. The combined workpieces were heat-treated in a nitrogen gas atmosphere at a temperature of 890° C. for 30 min so that the silver solder foil melted and adhered the respective workpieces together to form a single integral test piece. After cooling to a room temperature the test piece was cut with the laser beam under the same conditions as in Example 1, except that the output level of the laser beam was set at 100 W.

The test result was good and substantially the same as in the Example using the laser beam of 90 W.

As stated above, in the prior arts, it is very difficult to machine diamond with a laser beam, and if such a machining was carried out, a large number of cracks and splinters would occur, whereby the material loss becomes too high for practical use. According to the present invention, however, the laser beam machining of a diamond workpiece has been made possible for the first time. The present invention is particularly effective for the machining of a diamond thin plate, since during this machining process, cracks and splinters are not generated in the workpiece and the cut surface thereof is smooth, whereby a secondary finishing process is unnecessary.

We claim:

1. A method of processing a diamond workpiece, comprising forming a metallic membrane or layer on at least one surface of the diamond workpiece and then machining the diamond workpiece with a laser beam.

2. A method of processing a diamond workpiece, wherein the diamond workpiece is a thin plate and the method comprises forming a metallic membrane or layer on both side surfaces of the diamond workpiece and then machining the diamond workpiece with a laser beam.

3. A method as defined in claim 2, wherein the method comprises forming the metallic membrane or layer on the surface of the workpiece by a vacuum evaporation process.

4. A method as defined in claim 3, wherein the metallic membrane or layer comprises a metal selected from the group consisting of Au, Cu, Cr, Si, Ti, and Al.

5. A method as defined in claim 2, wherein the method comprises separately forming the metallic membrane or layer as a foil and later firmly adhering the foil to the workpiece.

6. A method as defined in claim 5, wherein the metallic membrane or layer comprises a metal selected from the group consisting of Au, Ag, Sn, Al, Cu, Fe and Cr.

7. A method of processing a diamond workpiece, comprising forming a metallic membrane or layer on at least one surface of the diamond workpiece and then machining the diamond workpiece with a laser beam, wherein the method further comprises forming the metallic membrane or layer on the surface of the workpiece by a vacuum evaporation process.

8. A method as defined in claim 7, wherein the metallic membrane or layer comprises a metal selected from the group consisting of Au, Cu, Cr, Si, Ti and Al.

9. A method of processing a diamond workpiece, comprising forming a metallic membrane or layer on at least one surface of the diamond workpiece and then machining the diamond workpiece with a laser beam, wherein the method further comprises separately forming the metallic membrane or layer as a foil and later firmly adhering the foil to the workpiece.

10. A method as defined in claim 9, wherein the metallic membrane or layer comprises a metal selected from the group consisting of Au, Ag, Sn, Al, Cu, Fe and Cr.

11. A method as defined in any of claims 1-6 or 7-10, wherein the diamond workpiece is an artificial diamond obtained by a CVD method.

12. A method as defined in any of claims 1-6 or 7-10, wherein the metallic membrane or layer has a thickness of more than 30 Å.

13. A method as defined in claim 12, wherein the thickness is more than 100 Å.

14. A method as defined in any of claims 1-6 or 7-10, wherein the method comprises laminating a plurality of different kinds of metallic layers together to form an integral single membrane or layer.

15. A method as defined in any of claims 1-6 or 7-10, wherein the laser beam is from a solid laser or a gas laser.

16. A method as defined in claim 15, wherein said solid laser is a ruby laser, a YAG laser or a a glass laser and said gas laser is a carbon dioxide gas laser or an Ar gas laser.

17. A method as defined in any of claims 1-6 or 7-10, wherein the method comprises forming the diamond workpiece by laminating a plurality of diamond thin plates with solder between each set of adjacent plates.

* * * * *